(12) United States Patent
Motilall

(10) Patent No.: US 9,876,524 B1
(45) Date of Patent: Jan. 23, 2018

(54) GLOVE AND SWIVELING TABLET COMPUTER CASE

(71) Applicant: Rajendranauth Motilall, Jersey City, NJ (US)

(72) Inventor: Rajendranauth Motilall, Jersey City, NJ (US)

( * ) Notice: Subject to any disclaimer, the term of this patent is extended or adjusted under 35 U.S.C. 154(b) by 0 days.

(21) Appl. No.: 15/358,372

(22) Filed: Nov. 22, 2016

(51) Int. Cl.
| | |
|---|---|
| *H04M 1/00* | (2006.01) |
| *H04B 1/3888* | (2015.01) |
| *A41D 19/00* | (2006.01) |
| *A45C 11/00* | (2006.01) |
| *A45C 13/00* | (2006.01) |
| *A45C 13/10* | (2006.01) |
| *A45F 5/00* | (2006.01) |
| *G06F 3/033* | (2013.01) |

(52) U.S. Cl.
CPC ....... *H04B 1/3888* (2013.01); *A41D 19/0037* (2013.01); *A45C 11/00* (2013.01); *A45C 13/002* (2013.01); *A45C 13/1076* (2013.01); *A45F 5/00* (2013.01); *G06F 3/033* (2013.01); *A45C 2011/002* (2013.01); *A45C 2011/003* (2013.01)

(58) Field of Classification Search
USPC ............... 455/550.1, 556.1, 575.1, 575.8
See application file for complete search history.

(56) References Cited

U.S. PATENT DOCUMENTS

| | | | |
|---|---|---|---|
| 7,334,711 B1* | 2/2008 | Winters | A45F 5/00 224/217 |
| D642,579 S | 8/2011 | Deutsch | |
| 8,328,055 B1 | 12/2012 | Snyder | |
| 8,676,279 B2 | 3/2014 | McCurdy | |
| 9,010,595 B2 | 4/2015 | Yu | |
| 2012/0138647 A1* | 6/2012 | Norling | A45F 5/00 224/267 |
| 2013/0091617 A1 | 4/2013 | Elias | |
| 2013/0295549 A1* | 11/2013 | Hills | G09B 7/00 434/379 |
| 2013/0300141 A1* | 11/2013 | Byrne | A45F 5/00 294/25 |
| 2015/0052660 A1* | 2/2015 | Chapman | A45F 5/00 2/160 |
| 2015/0164205 A1* | 6/2015 | Vales | H04M 1/04 224/219 |

FOREIGN PATENT DOCUMENTS

WO 2014181365 A1 11/2014

\* cited by examiner

*Primary Examiner* — Fayyaz Alam

(57) ABSTRACT

The glove and swiveling tablet computer case is an apparatus for holding a personal data device. The glove and swiveling tablet computer case comprises a PDD case, a glove, and a fastener. The fastener attaches the glove to the PDD case. The personal data device is inserted into the PDD case. When the glove and swiveling tablet computer case is arranged in this fashion the fastener mechanically attaches the glove to the PDD case to a hand in such a manner that the personal data device does not need to be held when the glove is worn. In the first potential embodiment of the disclosure, the fastener further attaches the personal data device to the glove in such a manner that the personal data device can be rotated to a convenient position while in use.

5 Claims, 4 Drawing Sheets

GLOVE AND SWIVELING TABLET COMPUTER CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including hand carried bags, more specifically, a receptacle configured for use with portable computing devices.

SUMMARY OF INVENTION

The glove and swiveling tablet computer case is an apparatus for holding a personal data device. The glove and swiveling tablet computer case comprises a PDD case, a glove, and a fastener. The fastener attaches the glove to the PDD case. The personal data device is inserted into the PDD case. When the glove and swiveling tablet computer case is arranged in this fashion the fastener mechanically attaches the glove to the PDD case to a hand in such a manner that the personal data device does not need to be held when the glove is worn. In the first potential embodiment of the disclosure, the fastener further attaches the personal data device to the glove in such a manner that the personal data device can be rotated to a convenient position while in use.

These together with additional objects, features and advantages of the glove and swiveling tablet computer case will be readily apparent to those of ordinary skill in the art upon reading the following detailed description of the presently preferred, but nonetheless illustrative, embodiments when taken in conjunction with the accompanying drawings.

In this respect, before explaining the current embodiments of the glove and swiveling tablet computer case in detail, it is to be understood that the glove and swiveling tablet computer case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the glove and swiveling tablet computer case.

It is therefore important that the claims be regarded as including such equivalent construction insofar as they do not depart from the spirit and scope of the glove and swiveling tablet computer case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
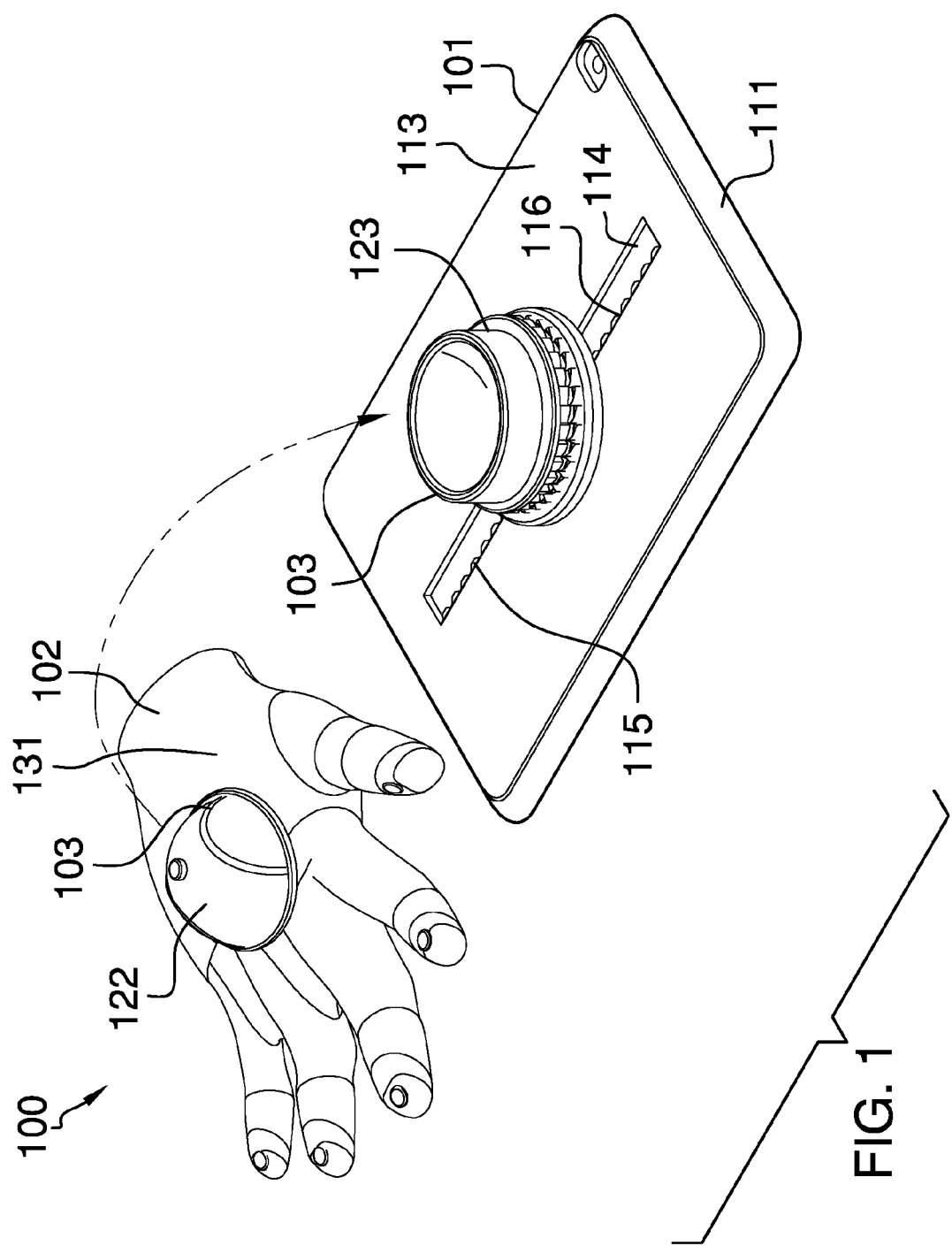
FIG. 1 is an exploded view of an embodiment of the disclosure.
Figure 2:
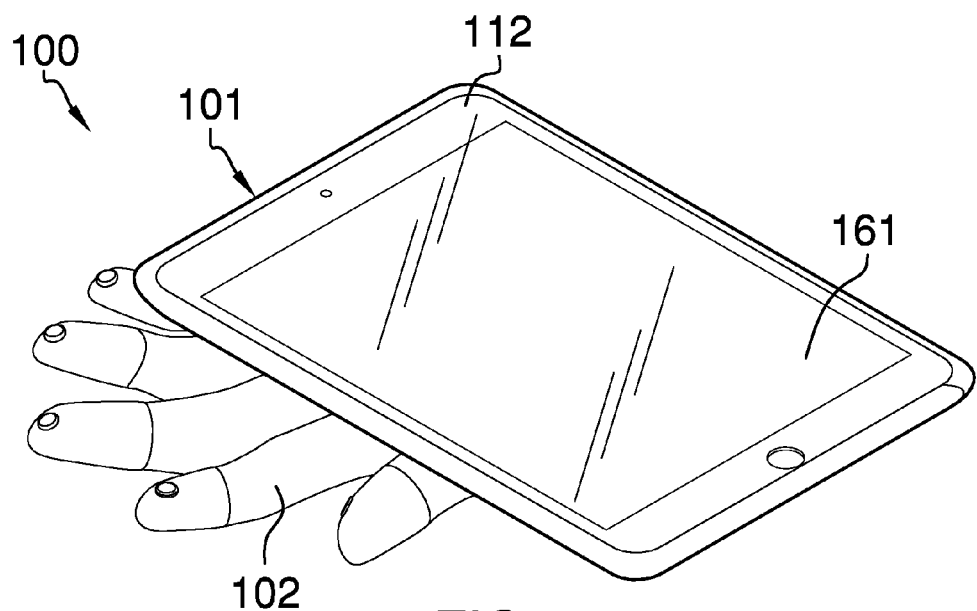
FIG. 2 is a perspective view of an embodiment of the disclosure.
Figure 3:
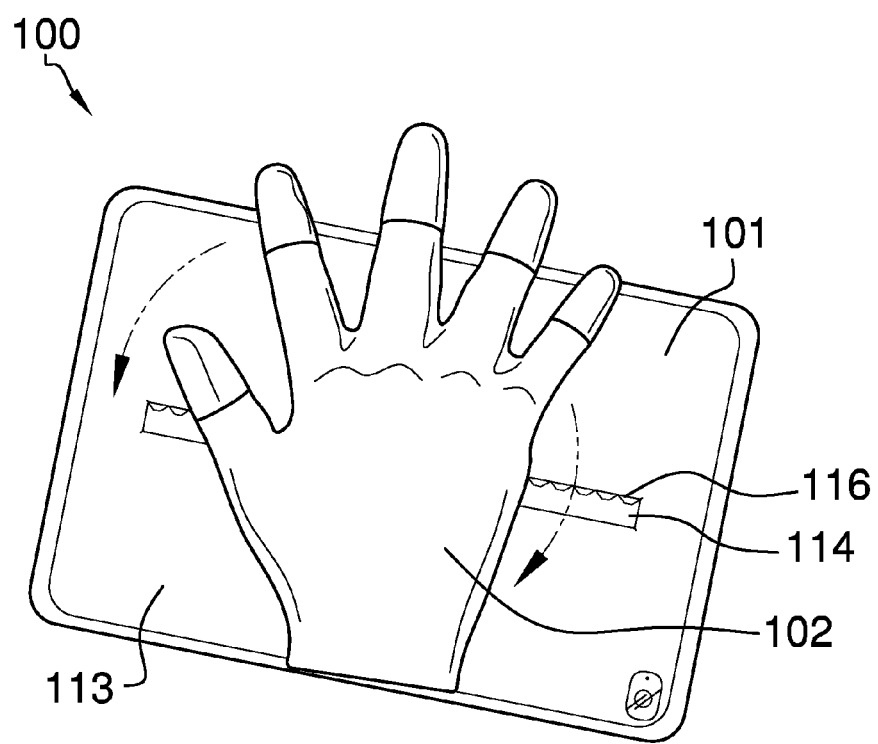
FIG. 3 is a bottom view of an embodiment of the disclosure.
Figure 4:
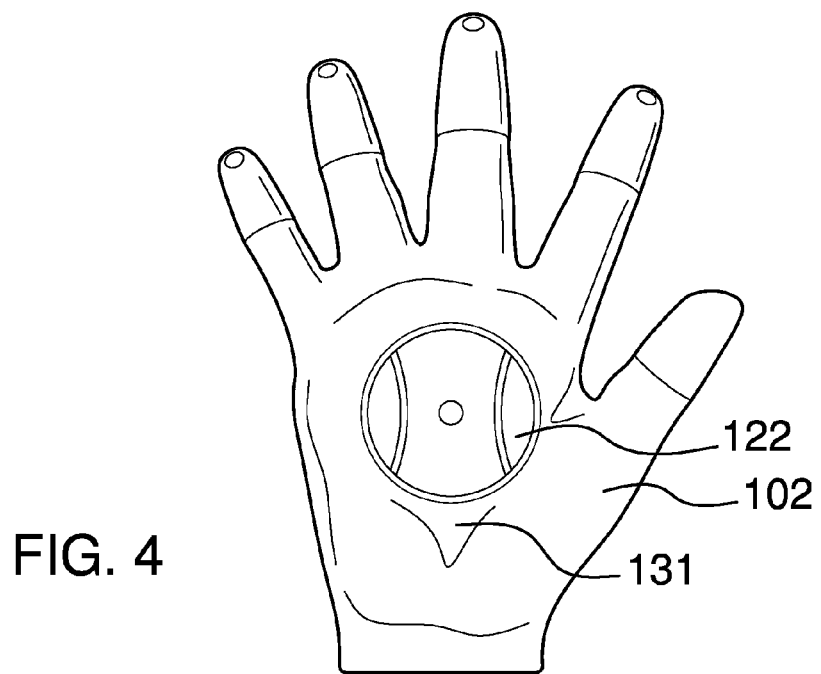
FIG. 4 is a detail view of an embodiment of the disclosure.
Figure 5:
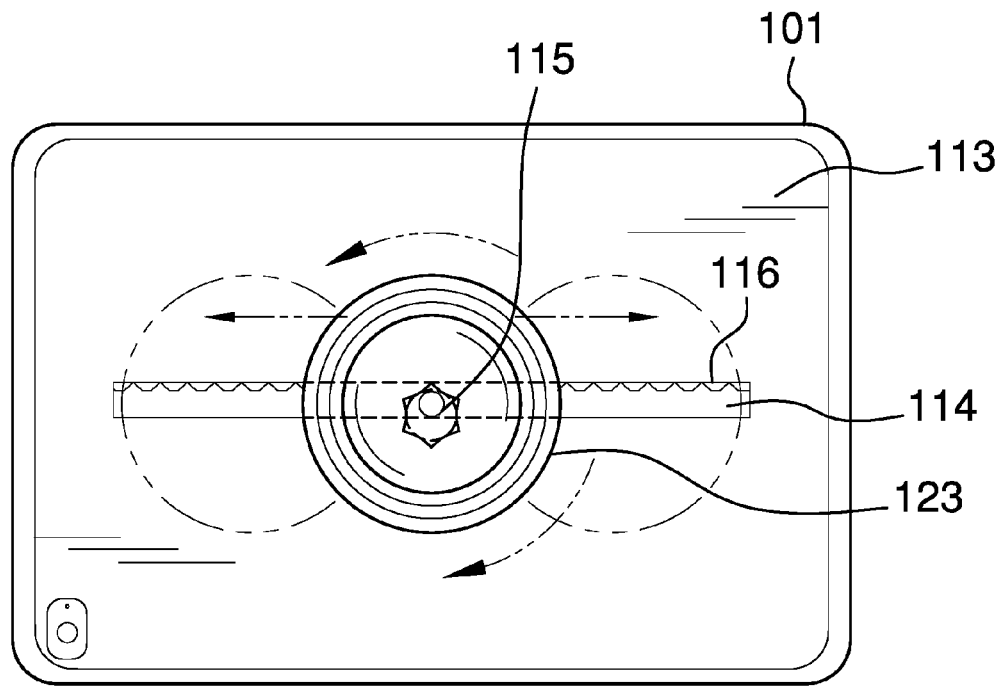
FIG. 5 is a detail view of an embodiment of the disclosure.
Figure 6:
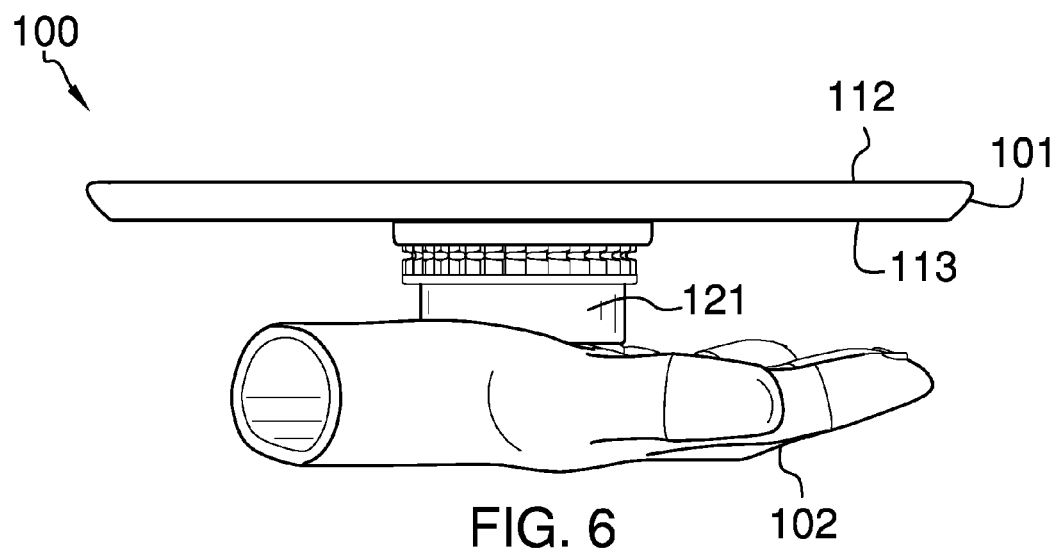
FIG. 6 is a side view of an embodiment of the disclosure.

Detailed reference will now be made to one or more potential embodiments of the disclosure, which are illustrated in FIGS. 1 through 6.

The glove and swiveling tablet computer case 100 (hereinafter invention) is an apparatus for holding a personal data device 161. The invention 100 comprises a PDD case 101, a glove 102, and a fastener 103. The fastener 103 attaches the glove 102 to the PDD case 101. The personal data device 161 is inserted into the PDD case 101. When the invention 100 is arranged in this fashion the fastener 103 mechanically attaches the glove 102 to the PDD case 101. When the glove 102 is worn, the personal data device 161 does not need to be held during use. In the first potential embodiment of the disclosure, the fastener 103 further attaches the personal data device 161 to the glove 102 in such a manner that the personal data device 161 can be rotated to a convenient position while in use.

The PDD case 101 is a protective container within which a personal data device 161 is contained. The size and shape of the any PDD case 101 is customized to fit a previously identified personal data device 161. The PDD case 101 comprises a shell 111, a track 114, and a latch mechanism 115. The shell 111 is further defined with an open surface 112 and a back surface 113. The PDD case 101 is a hollow rectangular block structure. The PDD case 101 is formed from a shock resistant plastic. Methods to form containers similar to the PDD case 101 are well known and documented in the mechanical and telecommunication arts.

The shell 111 is the physical structure of the PDD case 101 that physically contains the personal data device 161. The open surface 112 is the face of the shell 111 of the PDD case 101 through which the touchscreen of the personal data device 161 can be accessed. The back surface 113 is the face of the shell 111 of the PDD case 101 that is distal from the open surface 112.

The track 114 is a slot that is formed in the back surface 113 of the PDD case 101. The fastener 103 is attached to the track 114 such that the fastener 103 can be moved along the length of the track 114. The latch mechanism 115 is a device that locks the position of the fastener 103 into a fixed position relative to the PDD case 101. Techniques and methods to lock the position of objects within tracks are well known and documented in the mechanical arts. In the first potential embodiment of the disclosure, the latch mechanism 115 is a commercially available releasable ratchet 116 system.

The glove 102 is a readily and commercially available glove 102. In the first potential embodiment of the disclosure, the glove 102 is a touch screen glove that is configured for use with capacitive touchscreens. The glove 102 is further defined with a palm 131. The palm 131 is the portion of the glove 102 that is proximal to the palm of a hand when the glove 102 is being worn normally.

The fastener 103 is a connecting device that attaches the PDD case 101 to the glove 102. The fastener 103 is a commercially available device that is selected such that the PDD case 101 can be rotated relative to the position of the glove 102 while the fastener 103 assembled.

In the first potential embodiment of the disclosure, the fastener 103 comprises a ball and socket joint 121. The ball and socket joint 121 is a fastener 103 that allows rotary motion between the PDD case 101 and the glove 102. The selected ball and socket joint 121 further comprises a mechanism to lock the ball and socket joint 121 into a fixed position.

The ball and socket joint 121 comprises a ball apportionment 122 and a socket apportionment 123. The ball apportionment 122 is the ball segment of the ball and socket joint 121. The socket apportionment 123 is the socket portion of the ball and socket joint 121. The ball apportionment 122 is inserted into the socket apportionment 123 to form the ball and socket 121 joint.

To assemble the invention 100, the ball apportionment 122 of the ball and socket joint 121 attaches to the palm 131 of the glove 102. The socket apportionment 123 of the ball and socket joint 121 attaches to the track 114 of the PDD case 101.

To use the first potential embodiment of the disclosure, the glove 102 is worn normally. The ball apportionment 122 of the ball and socket joint 121 is inserted into the socket apportionment 123 of the ball and socket joint 121. The personal data device 161 is then used normally.

The following definitions were used in this disclosure:

Ball and Socket Joint: As used in this disclosure, a ball and socket joint means a manufactured joint or coupling in which a partially spherical object lies in a socket, allowing for multidirectional movement and rotation within limits determined by the construction of the ball and socket joint.

Fastener: As used in this disclosure, a fastener is a device that is used to join or affix two objects. Fasteners generally comprise a first element, which is attached to the first object and a second element which is attached to the second object such that the first element and the second element join to affix the first object and the second object.

Latch: As used in this disclosure, a latch is a fastening or locking mechanism. The use of the term latch does not necessarily but often implies the insertion of an object into a notch or cavity.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

Ratchet: As used in this disclosure, a ratchet is a device comprising a pawl or hinged catch that engages the sloping teeth of a wheel or bar permitting motion in one direction only. In some configurations, ratchets will further comprise a release mechanism that allows the ratchet to be readily reset to an initial position.

Slot: As used in this disclosure, a slot is a long narrow groove or aperture that is formed in an object.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A carrying case comprising:

a PDD case, a glove, and a fastener;

wherein the carrying case is an apparatus for holding a personal data device;

wherein the fastener attaches the glove to the PDD case;

wherein the personal data device is inserted into the PDD case;

wherein the personal data device can be rotated to a convenient position while in use;

wherein the PDD case is a protective container within which a personal data device is contained;

wherein the size and shape of the any PDD case is customized to fit the personal data device;

wherein the PDD case comprises a shell, a track, and a latch mechanism;

wherein the track and the latch mechanism are attached to the shell;

wherein the shell is further defined with an open surface and a back surface;

wherein the PDD case is a hollow rectangular block structure;

wherein the PDD case is formed from a shock resistant plastic;

wherein the shell is the physical structure of the PDD case that physically contains the personal data device;

wherein the open surface is the face of the shell of the PDD case through which the personal data device can be accessed;

wherein the back surface is the face of the shell of the PDD case that is distal from the open surface;

wherein the track is a slot that is formed in the back surface of the PDD case;

wherein the fastener attaches to the track such that the fastener can be moved along the length of the track;

wherein the latch mechanism is a device that locks the position of the fastener into a fixed position relative to the PDD case;

wherein the glove is configured for use with a capacitive touchscreens;

wherein the glove is further defined with a palm;

wherein the palm is the portion of the glove that is proximal to the palm of a hand when the glove is being worn normally;

wherein the fastener is a connecting device;

wherein the fastener is such that the PDD case can be rotated relative to the position of the glove while the fastener assembled;

wherein the fastener comprises a ball and socket joint;

wherein the ball and socket joint further comprises a mechanism to lock the ball and socket joint into a fixed position;

wherein the ball and socket joint comprises a ball apportionment and a socket apportionment;

wherein the ball apportionment is the ball segment of the ball and socket joint;

wherein the socket apportionment is the socket portion of the ball and socket joint.

2. The carrying case according to claim 1 wherein the socket apportionment of the ball and socket joint attaches to the track of the PDD case.

3. The carrying case according to claim 2 wherein the ball apportionment of the ball and socket joint attaches to the palm of the glove.

4. The carrying case according to claim 3 wherein the ball apportionment of the ball and socket joint is inserted into the socket apportionment of the ball and socket joint.

5. The carrying case according to claim 4 wherein in the latch mechanism is releasable ratchet device.

\* \* \* \* \*